United States Patent [19]

Kawata et al.

[11] Patent Number: 4,730,709
[45] Date of Patent: Mar. 15, 1988

[54] LOCKUP CLUTCH CONTROL SYSTEM

[75] Inventors: Shoji Kawata; Tsuyoshi Yoshida, both of Okazaki, Japan

[73] Assignee: Aisin Seiki Kabushiki Kaisha, Aichi, Japan

[21] Appl. No.: 890,984

[22] Filed: Jul. 30, 1986

Related U.S. Application Data

[63] Continuation of Ser. No. 564,277, Dec. 22, 1983, abandoned.

[30] Foreign Application Priority Data

Dec. 25, 1982 [JP] Japan ................. 57-231171

[51] Int. Cl.⁴ ............................. F16H 45/02
[52] U.S. Cl. ................. 192/3.31; 192/3.28; 192/103 C
[58] Field of Search ............ 192/0.033, 3.28, 3.29, 192/3.3, 3.31, 103 R, 103 C

[56] References Cited

U.S. PATENT DOCUMENTS 4,257,503  3/1981  Lutnick ....................... 192/3.23
4,363,973  12/1982  Kawata et al. ............. 307/10 R
4,386,521  6/1983  Hamada et al. ........... 192/103 R X
4,393,467  7/1983  Miki et al. ................. 364/424.1
4,431,095  2/1984  Suga .......................... 192/3.31
4,463,842  8/1984  Redzinski .................. 192/3.31 X
4,471,438  9/1984  Futagi et al. .............. 192/3.31 X
4,499,542  2/1985  Hamajima et al. ........ 364/424.1
4,499,979  2/1985  Suzuki et al. .............. 192/3.31
4,503,956  3/1985  Suzuki et al. .............. 192/3.31

FOREIGN PATENT DOCUMENTS 2084673  9/1981  United Kingdom .

Primary Examiner—Rodney H. Bonck
Assistant Examiner—Richard M. Lorence
Attorney, Agent, or Firm—Sughrue, Mion, Zinn, Macpeak & Seas

[57] ABSTRACT

A lockup clutch in a torque converter is connected by a lockup solenoid energized in response to a lockup signal generated by a lockup discrimination circuit. When a speed sensor detects a rate of deceleration higher than a predetermined level at the time the vehicle is abruptly braked, for example, a lockup control circuit overrides the lockup discrimination circuit to cut off the lockup signal for thereby de-energizing the lockup solenoid, whereupon the lockup clutch is disconnected.

5 Claims, 1 Drawing Figure

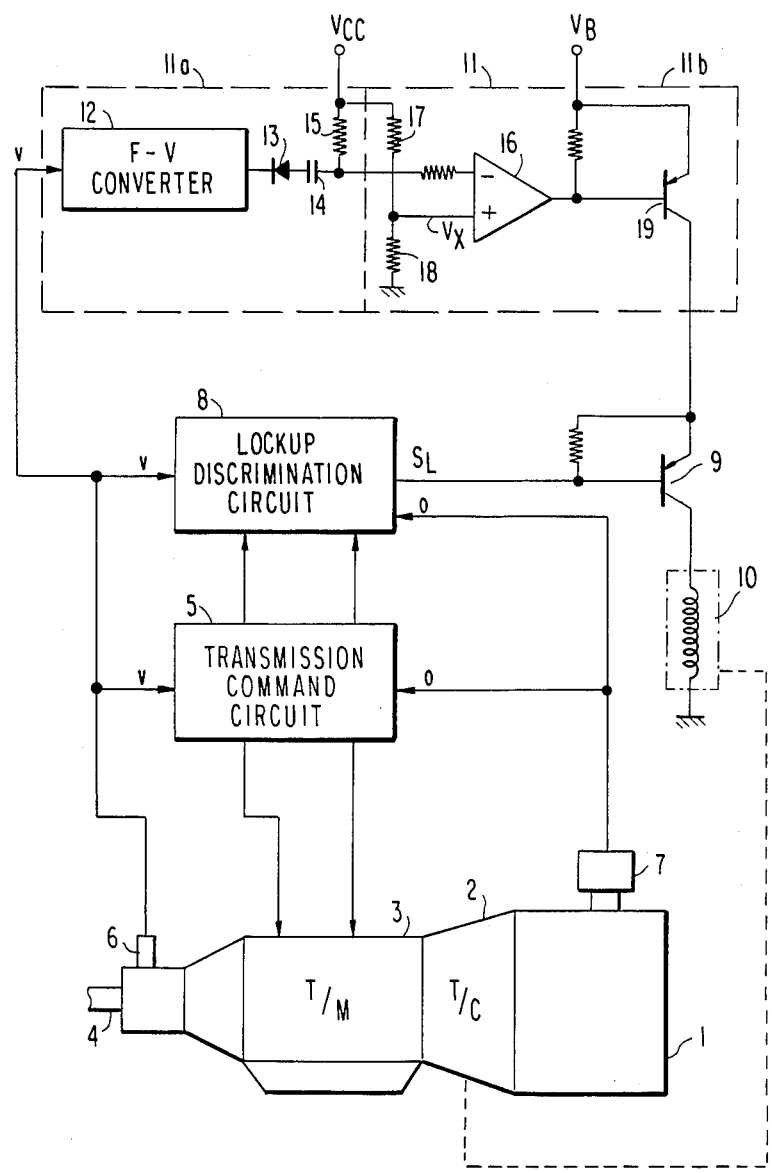

LOCKUP CLUTCH CONTROL SYSTEM

This is a continuation of application Ser. No. 564,277, filed Dec. 22, 1983, now abandoned.

BACKGROUND OF THE INVENTION

The present invention relates to an automatic transmission having a torque converter with a lockup clutch for directly coupling input and output shafts of the torque converter in response to the application of a lockup signal, and more particularly to a lockup clutch control system for such an automatic transmission, the system being capable of preventing the issuance of a lockup signal in the event of detection of a certain rate of deceleration.

Automatic transmission incorporate a torque converter for taking up variations in the torque transmitted from an engine and transmitting an amplified engine torque to a rear transmission mechanism. The torque converter has input and output shafts which are not mechanically coupled with each other and hence are subject to slipping. Therefore, the torque converter has a poor efficiency of power transmission. To cope with this problem, there has been put to use an automatic transmission having a lockup clutch for directly coupling torque converter input and output shafts at relatively high vehicle speeds at which no increased torque is necessary and engine torque variations cause no problem.

The automatic transmission with such a lockup clutch is disadvantageous in that when the road is slippery at the time the vehicle is braked or when the vehicle is abruptly braked, the wheels are locked against rotation. If the lockup clutch is connected or locked up at this time, then the lockup clutch is not released soon and the engine is stopped, a condition which is dangerous in the driving of the vehicle.

SUMMARY OF THE INVENTION

It is an object of the present invention to provide a lockup clutch control system capable of preventing an engine from being stopped when the vehicle is braked.

To achieve the above object, the issuance of a lockup signal is prevented to thereby release a lockup clutch of a locked condition when a certain rate of deceleration or higher is detected by a means for detecting the deceleration of a vehicle. By thus releasing the lockup clutch, the engine can be prevented from being stopped at the time the vehicle is braked. An electronically controlled lockup clutch control system includes a vehicle speed sensor for electrically detecting the vehicle speed, and the deceleration detecting means may be supplied with an input signal based on a signal from such a vehicle speed sensor. Where the electronically controlled lockup clutch control system is employed, therefore, the entire control system is rendered simple in construction, and no special vehicle speed sensor is required for lockup clutch control.

The above and other objects, features and advantages of the present invention will become more apparent from the following description when taken in conjunction with the accompanying drawing in which a preferred embodiment of the present invention is shown by way of illustrative example.

BRIEF DESCRIPTION OF THE DRAWING

The sole FIGURE is a circuit diagram, partly in block form, of a lockup clutch control system according to the present invention.

DESCRIPTION OF THE PREFERRED EMBODIMENT

As shown in the FIGURE, the output power from an engine 1 is transmitted to a lockup torque converter 2, and the power from the torque converter 2 is then transmitted to an output shaft 4 through a transmission 3 having a train of power transmission gears. A transmission command circuit 5 is supplied with an electic signal v indicative of a vehicle speed as detected by a vehicle speed sensor 6 and an electric signal $\theta$ indicative of a throttle opening as detected by a throttle sensor 7. Although not shown, the transmission command circuit 5 may be fed with other signals such as an engine rotation speed signal, a water temperature signal, and a planetary gear rotation speed signal. The transmission command circuit 5 is based on these signals for generating a drive signal according to a prescribed shift pattern to actuate the power transmission gear train for automatic gear shifting operation.

A lockup discrimination circuit 8 is supplied with the vehicle speed signal v, the throttle opening signal $\theta$, and a gear shift signal fed from the transmission command circuit 5. More specifically, the lockup discrimination circuit 8 determines a gear position based on the gear shift signal. When the vehicle speed v and the throttle opening signal $\theta$ are increased up to a prescribed lockup region, the lockup discrimination circuit 8 issues a lockup signal SL of a high level. When the lockup signal SL is applied, a transistor 9 is rendered conductive to energize a lockup solenoid 10, whereupon a lockup clutch in the torque converter 2 is directly coupled to lock up the torque converter 2. (The foregoing construction and operation are the same as those of a conventional automatic transmission with a lockup clutch which is typically disclosed in U.S. Pat. No. 4,431,095.

A lockup clutch control system 11 essentially includes a deceleration detecting means comprising a deceleration detecting circuit 11a and a discriminator circuit 11b. The deceleration detecting circuit 11a is supplied with the vehicle speed signal v which is converted by a frequency-to-voltage converter 12 into a voltage corresponding to the detected vehicle speed. The voltage is then applied through a diode 13 to one terminal of a capacitor 14, the other terminal of which is connected through a resistor 15 to a regulated power supply Vcc and to an inverting input terminal (−) of a comparator 16 in the discriminator circuit 11b. The comparator 16 has a noninverting input terminal (+) to which there is supplied a reference voltage Vx obtained by dividing the voltage from the regulated power supply Vcc with resistors 17, 18. An output from the comparator 16 is applied to the base of a transistor 19. The transistor 19 has a collector coupled to the emitter of a transistor 9 and an emitter to a power supply VB.

In operation, the vehicle speed signal v applied to the lockup clutch control circuit 11 is converted by the frequency-to-voltage converter 12 into the corresponding voltage, which is differentiated by the capacitor 14 and the resistor 15. The differentiated signal is then fed to the inverting input terminal (−) of the comparator 16.

The waveform of the differentiated signal has peak values on falling edges due to the diode 13. The output from the frequency-to-voltage converter 12 has a voltage waveform representative of variations in the vehicle speed v. When the vehicle speed v varies smoothly, the capacitor 14 is charged through the resistor 15, and the input signal to the inverting input terminal (−) of the comparator 16 has a value indicative of the vehicle speed v and not below the reference level Vx. The output signal from the comparator 16 is kept at a high level, thus maintaining the transistor 19 energized. Accordingly, the transistor 9 is rendered conductive or nonconductive and hence the lockup solenoid 10 is energized or de-energized to connect or disconnect the lockup clutch dependent on whether the lockup signal SL is applied or not from the lockup discrimination circuit 8.

When the vehicle speed is abruptly reduced by braking the vehicle, the output signal from the frequency-to-voltage circuit 12 is also varied abruptly. The peak values of the differentiated waveform becomes large, or the voltage level is lowered below the reference voltage Vx. The output signal from the comparator 16 then goes low to turn off the transistor 19 and hence the transistor 9. Therefore, the lockup clutch is disconnected, or cut off, from the power supply line $V_B$ irrespectively of whether the lockup signal SL is applied or not, so that any lockup signal signal SL generated will be overridden.

The rate of deceleration at which the lockup condition is to be released can be adjusted as desired by selecting a time constant determined by the resistor 15 and the capacitor 14 and the reference voltage Vx. The interval of time during which the lockup clutch is to remain disconnected is determined by the time constant determined by the resistor 15 and the capacitor 14, that is, the time required for the differentiated waveform of the output signal from the frequency-to-voltage circuit 12 to rise up to the reference voltage level Vx.

In the illustrated embodiment, the foregoing control has been shown as being implemented by the electric circuit. However, the control may be effected by a hydraulic circuit.

Although a certain preferred embodiment has been shown an described, it should be understood that many changes and modifications may be made therein without departing from the scope of the appended claims.

What is claimed is:

1. A lockup clutch control system for use on a vehicle of the type having a torque converter including input and output shafts and a lockup clutch for directly connecting said input and output shafts of said torque converter, said system comprising:
   lockup discrimination circuit means for generating a lockup signal;
   a lockup solenoid for actuating said lockup clutch in response to said lockup signal;
   a speed sensor for detecting the speed of the vehicle;
   deceleration detecting circuit means for detecting the deceleration of the vehicle based on a signal from said speed sensor; and
   discriminator circuit means for de-energizing said lockup solenoid for at least a minimum interval of time in response to detection by said detecting circuit means of a rate of deceleration higher than a predetermined level, wherein said minimum interval of time is substantially independent of the vehicle speed subsequent to de-energizing said lockup solenoid and is determined by said detecting circuit means which also determines the rate of deceleration at which said lockup clutch is to be released.

2. A lockup clutch control system according to claim 1, wherein said discriminator circuit means includes means for cutting off a power supply line connected to said lockup solenoid, thereby de-energizing said lockup solenoid.

3. A lockup clutch control system according to claim 1, wherein said discriminator circuit means includes means for overriding said lockup discrimination circuit means to cut off said lockup signal, thereby de-energizing said lockup solenoid.

4. A lockup clutch control system according to claim 1 wherein said detecting circuit means includes converter means for converting said signal from said speed sensor into a voltage and capacitor and resistor means for differentiating said voltage to detect the deceleration of the vehicle.

5. A lockup clutch control system according to claim 1, wherein said detecting circuit means includes means for determining said minimum interval of time for which said lockup solenoid is de-energized in accordance with the rate of deceleration detected by said detecting circuit.

* * * * *